US005866808A

United States Patent [19]

Ooyabu et al.

[11] Patent Number: 5,866,808

[45] Date of Patent: Feb. 2, 1999

[54] APPARATUS FOR DETECTING CONDITION OF BURNING IN INTERNAL COMBUSTION ENGINE

[75] Inventors: Shinji Ooyabu, Anjo; Yasuo Ito, Nagoya; Kazuhisa Mogi, Susono, all of Japan

[73] Assignees: Denso Corporation, Kariya; Toyota Jidosha Kabushiki Kaisha, Toyota, both of Japan

[21] Appl. No.: 748,785

[22] Filed: Nov. 14, 1996

[30] Foreign Application Priority Data

| | | | |
|---|---|---|---|
| Nov. 14, 1995 | [JP] | Japan | 7-295043 |
| Nov. 6, 1996 | [JP] | Japan | 8-293807 |

[51] Int. Cl.[6] ..... F02P 17/00; G01M 15/00

[52] U.S. Cl. ..... 73/116; 73/35.08; 324/399

[58] Field of Search ..... 73/35.08, 116, 73/117.2, 117.3; 364/431.03, 431.08; 340/439; 324/380, 382, 393, 399, 402

[56] References Cited

U.S. PATENT DOCUMENTS

| | | | |
|---|---|---|---|
| 4,359,893 | 11/1982 | Kizler et al. | 73/115 |
| 4,648,367 | 3/1987 | Gillbrand et al. | 73/115 |
| 5,215,067 | 6/1993 | Shimasaki et al. | 324/399 |
| 5,226,394 | 7/1993 | Shimasaki et al. | 324/399 |
| 5,321,978 | 6/1994 | Brandt et al. | 73/116 |
| 5,347,855 | 9/1994 | Miyata et al. | 73/116 |
| 5,383,350 | 1/1995 | Bennett et al. | 73/117.3 |
| 5,548,220 | 8/1996 | Kawamoto et al. | 324/399 |
| 5,561,239 | 10/1996 | Yasuda | 73/35.08 |
| 5,563,332 | 10/1996 | Yasuda | 73/35.08 |

FOREIGN PATENT DOCUMENTS

| | | |
|---|---|---|
| 50-094330 | 7/1975 | Japan . |
| 61-057830 | 3/1986 | Japan . |
| 6-317214 | 11/1994 | Japan . |

*Primary Examiner*—George M. Dombroske
*Attorney, Agent, or Firm*—Cushman, Darby Cushman IP Group of Pillsbury Madison & Sutro LLP

[57] ABSTRACT

An apparatus for detecting a condition of burning in an internal combustion engine includes a spark plug and an ignition coil. The ignition coil has a primary winding and a secondary winding. The secondary winding is connected to the spark plug. An ion current sensing resistor is connected to a low voltage side of the secondary winding of the ignition coil for sensing an ion current. A diode is connected in parallel with the primary winding of the ignition coil. A switching element is connected in series with the primary winding of the ignition coil. The switching element is movable into and out of an on state. A suitable device is operative for resisting a current flowing through the diode when the switching element is in the on state.

9 Claims, 5 Drawing Sheets

FIG. 2(a) IGNITION SIGNAL IGt
FIG. 2(b) PRIMARY CURRENT I1
FIG. 2(c) SECONDARY CURRENT I2
FIG. 2(d) OUTPUT SIGNAL AVAILABLE IN COMPARATIVE APPARATUS
FIG. 2(e) OUTPUT SIGNAL OF OPERATIONAL AMPLIFIER 20
t1
t2
t3
t4
t5
5V
0
6A
60mA
VB
SNon
SNRM
SIION
SINOCK
TIME t1
t2
t3
t4
t5

IGNITION SIGNAL IGt
5V
0

PRIMARY CURRENT I1
6A
0

SECONDARY CURRENT I2
60mA
0

OUTPUT SIGNAL AVAILABLE IN COMPARATIVE APPARATUS
VB
0
SNon
SNRM
SINOCK
SIION

OUTPUT SIGNAL OF OPERATIONAL AMPLIFIER 20
VB
0
SNon
SNRM
SINOCK
SIION
TIME

APPARATUS FOR DETECTING CONDITION OF BURNING IN INTERNAL COMBUSTION ENGINE

BACKGROUND OF THE INVENTION

1. Field of the Invention

This invention relates to an apparatus for detecting a condition of burning in an internal combustion engine.

2. Description of the Prior Art

Japanese published unexamined patent application 61-57830 discloses a method and a device for deciding on abnormal combustion. According to Japanese application 61-57830, when an air-fuel mixture gas in a combustion engine is fired by the spark discharge of an ignition plug, a voltage for measurement is applied to the ignition plug and an ion current flows between electrodes of the ignition plug. The ion current has various frequency components. In Japanese application 61-57830, the ion current causes a resistance to generate a terminal voltage, which is amplified for a necessary time after the discharge. A knock component and a natural oscillation component are extracted from the terminal voltage by filters respectively. Outputs of the filters are integrated, and a divider calculates the ratio between the integration results. In Japanese application 61-57830, the output voltage of the divider is compared with a voltage corresponding to a predetermined knocking intensity limit to decide on abnormal combustion.

Japanese published unexamined patent application 50-94330 discloses an apparatus for detecting a misfire in an internal combustion engine. In the apparatus of Japanese application 50-94330, detection is made as to an ignition-indicating signal and an ion current signal outputted from an ignition plug. The ion current signal contains a burning signal which is slightly delayed from the ignition-indicating signal. The apparatus of Japanese application 50-94330 includes a comparator which serves to compare the ion current signal with an ignition command signal synchronous with a high tension voltage applied to the ignition plug. Only when both the ignition command signal and the burning signal are simultaneously effective, the comparator outputs an active signal. The apparatus of Japanese application 50-94330 includes a deciding section which determines whether or not an air-fuel mixture in a related engine cylinder has been successfully ignited in response to the output signal of the comparator.

In the apparatus of Japanese application 50-94330, an ion gap has a resistance depending on ion conditions in the related engine cylinder. In addition, an ion current occurs which depends on the resistance of the ion gap. The apparatus of Japanese application 50-94330 includes a filter for removing noise components from the ion current. The output signal of the filter is shaped into a pulse signal constituting the ion current signal.

Generally, magnetic energy tends to remain in an ignition coil after the end of discharge across an ignition plug. This residual magnetic energy causes noise superimposed on an ion current signal outputted from the ignition plug. Both Japanese application 61-57830 and Japanese application 50-94330 fail to teach a countermeasure for such noise.

SUMMARY OF THE INVENTION

It is an object of this invention to provide an improved apparatus for detecting a condition of burning in an internal combustion engine.

A first aspect of this invention provides an apparatus for detecting a condition of burning in an internal combustion engine which comprises a spark plug; an ignition coil having a primary winding and a secondary winding, the secondary winding being connected to the spark plug; an ion current sensing resistor connected to a low voltage side of the secondary winding of the ignition coil for sensing an ion current; a diode connected in parallel with the primary winding of the ignition coil; a switching element connected in series with the primary winding of the ignition coil and being movable into and out of an on state; and means for resisting a current flowing through the diode when the switching element is in the on state.

A second aspect of this invention is based on the first aspect thereof, and provides an apparatus further comprising a zener diode connected in parallel with the ion current sensing resistor for suppressing on discharge.

A third aspect of this invention is based on the first aspect thereof, and provides an apparatus further comprising a discharge loop for the ion current, a power supply located in the discharge loop for detection of the ion current, and a zener diode disposed in the discharge loop for clamping residual magnetism in the ignition coil, the discharge loop having the secondary winding of the ignition coil and the spark plug.

A fourth aspect of this invention provides an apparatus for detecting a condition of burning in an internal combustion engine which comprises a spark plug; an ignition coil having a primary winding and a secondary winding, the secondary winding being connected to the spark plug; an ion current sensing resistor connected to a low voltage side of the secondary winding of the ignition coil for sensing an ion current; a first diode connected in parallel with the ion current sensing resistor for suppressing on discharge; a residual magnetism resonance element connected in parallel with the first diode for providing resonance with respect to residual magnetism; a power supply for detection of the ion current; and a second diode for clamping the residual magnetism, the second diode having a cathode and an anode, the cathode being connected to the secondary winding of the ignition coil, the anode being connected to the power supply.

A fifth aspect of this invention provides an apparatus for detecting a condition of burning in an internal combustion engine which comprises a spark plug; an ignition coil having a primary winding and a secondary winding, the secondary winding being connected to the spark plug; an ion current sensing resistor connected to a low voltage side of the secondary winding of the ignition coil for sensing an ion current; a first diode connected in parallel with the primary winding of the ignition coil; a switching element connected in series with the primary winding of the ignition coil and being movable into and out of an on state; means for resisting a current flowing through the diode when the switching element is in the on state; a second diode connected in parallel with the ion current sensing resistor for suppressing on discharge; a residual magnetism resonance element connected in parallel with the second diode for providing resonance with respect to residual magnetism; a power supply for detection of the ion current; and a third diode for clamping the residual magnetism, the second diode having a cathode and an anode, the cathode being connected to the secondary winding of the ignition coil, the anode being connected to the power supply.

A sixth aspect of this invention provides an apparatus for detecting a condition of burning in an internal combustion engine which comprises a spark plug; an ignition coil having a primary winding and a secondary winding; a first zener diode; a second zener diode; and a third zener diode;

wherein the spark plug, the secondary winding of the ignition coil, the first zener diode, the second zener diode, and the third zener diode are connected in a loop, and one of polarities of the first, second, and third zener diodes is opposite to remaining two of the polarities with respect to a direction of a current flowing through the loop.

A seventh aspect of this invention is based on the sixth aspect thereof, and provides an apparatus further comprising means connected to the loop for detecting an ion current flowing through a part of the loop.

An eighth aspect of this invention is based on the sixth aspect thereof, and provides an apparatus further comprising a series combination of a diode and a resistor which is connected in parallel with the primary winding of the ignition coil.

A ninth aspect of this invention is based on the sixth aspect thereof, and provides an apparatus further comprising a capacitor connected in parallel with one of the first, second, and third zener diodes.

DESCRIPTION OF THE PREFERRED EMBODIMENTS

First Embodiment

Figure 1:
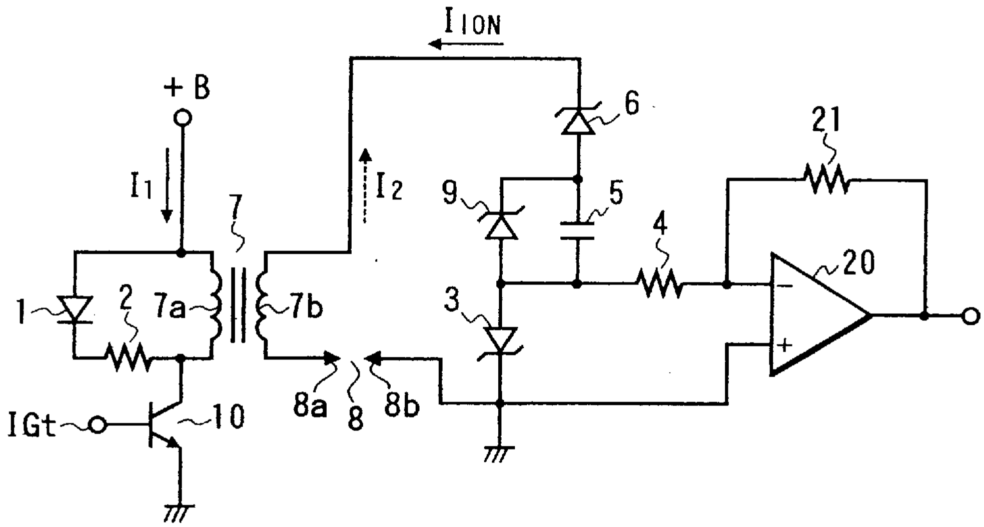
FIG. 1 is a schematic diagram of an apparatus for detecting a burning condition according to a first embodiment of this invention.

With reference to FIG. 1, an apparatus for detecting a condition of burning in an internal combustion engine includes an ignition coil 7 which has a primary winding 7*a* and a secondary winding 7*b*. A first end of the primary winding 7*a* of the ignition coil 7 is connected to the positive terminal "+B" of a battery. The negative terminal of the battery is grounded. The anode of a diode 1 is connected to the first end of the primary winding 7*a* of the ignition coil 7. The cathode of the diode 1 is connected via a resistor 2 to a second end of the primary winding 7*a* of the ignition coil 7. The second end of the primary winding 7*a* of the ignition coil 7 is grounded via a switching element 10 such as a switching transistor. The switching element 10 has a control terminal or a gate subjected to an ignition signal IGt outputted from an electronic control unit (not shown). The switching element 10 is closed and opened in response to the ignition signal IGt.

When the switching element 10 is closed by the ignition signal IGt, the battery enables a primary current I1 to flow through the primary winding 7*a* of the ignition coil 7. The diode 1 serves to block a current flowing along a direction opposite to the direction of the primary current I1. When the switching element 10 is closed, a current also flows through the diode 1. The resistor 2 serves to suppress the current flowing through the diode 1.

A spark plug 8 provided in a cylinder (a combustion chamber) of the internal combustion engine has a pair of first and second electrodes 8*a* and 8*b* opposed to each other. A first end of the secondary winding 7*b* of the ignition coil 7 is connected to the cathode of a zener diode 6. A second end of the secondary winding 7*b* of the ignition coil 7 is connected to the first electrode 8*a* of the spark plug 8. The second electrode 8*b* of the spark plug 8 is grounded. The anode of the zener diode 6 is connected to the cathode of a zener diode 9 and also a first end of a capacitor 5. The anode of the zener diode 9 and a second end of the capacitor 5 are connected in common to the anode of a zener diode 3. The capacitor 5 serves as a power supply for the detection of an ion current. The cathode of the zener diode 3 is grounded. The secondary winding 7*b* of the ignition coil 7, the spark plug 8, the zener diodes 3, 6, and 9, and the capacitor 5 are connected to form a closed-loop path along which a secondary current I2 flows. The zener diode 3 is located in a normal direction with respect to the secondary current I2. The zener diode 6 is located in a reverse direction with respect to the secondary current I2. The zener diode 9 controls the voltage across the capacitor 5.

One end of a resistor 4 is connected to the junction among the capacitor 5 and the zener diodes 3 and 9. The other end of the resistor 4 is connected to the inverting input terminal of an operational amplifier 20. The non-inverting input terminal of the operational amplifier 20 is grounded. The output terminal of the operational amplifier 20 is connected via a resistor 21 to the inverting input terminal thereof. The resistor 21 determines the gain of the operational amplifier 20. The resistor 21 has a predetermined high resistance equal to, for example, 500 KΩ.

During a given time interval, an ion current $I_{ION}$ flows via the inverting input terminal of the operational amplifier 20, the resistor 4, the capacitor 5, the zener diode 6, the secondary winding 7*b* of the ignition coil 7, the spark plug 8, the ground, and the non-inverting input terminal of the operational amplifier 20. As previously described, the capacitor 5 serves as a power supply for the detection of an ion current $I_{ION}$. The voltage across the resistor 4 depends on the ion current $I_{ION}$. Thus, the resistor 4 serves to sense the ion current $I_{ION}$. The resistor 4 has a predetermined high resistance equal to, for example, 500 KΩ. The high resistance of the resistor 4 is effective in suppressing unwanted ignition of an air-fuel mixture in the engine cylinder.

The diode 1 has the following function. When residual magnetism occurs in the ignition coil 7, a current caused by the residual magnetism is allowed to flow through the primary winding 7*a* of the ignition coil 7, the resistor 2, and the diode 1. Accordingly, energy of the residual magnetism is consumed.

The zener diode 3 has the following functions. The zener diode 3 suppresses unwanted ignition of an air-fuel mixture in the engine cylinder. In addition, the zener diode 3 suppresses voltage resonance caused by residual magnetism. Furthermore, the zener diode 3 suppresses resonance of an arc voltage between the first and second electrodes 8*a* and 8*b* of the spark plug 8. It is preferable that the zener diode 3 has a predetermined high zener voltage in the range of, for example, 400 V to 800 V.

The zener diode 6 has the following function. The zener diode 6 suppresses voltage resonance caused by residual magnetism. Specifically, the zener diode 6 shortens the life time of the voltage resonance. It is preferable that the zener diode 6 has a predetermined low zener voltage equal to, for example, 75 V.

A comparative apparatus is made which equals the apparatus of FIG. 1 except for the following point. The diode 1, the resistor 2, and the zener diodes 3 and 6 are absent from the comparative apparatus.

Figure 2:
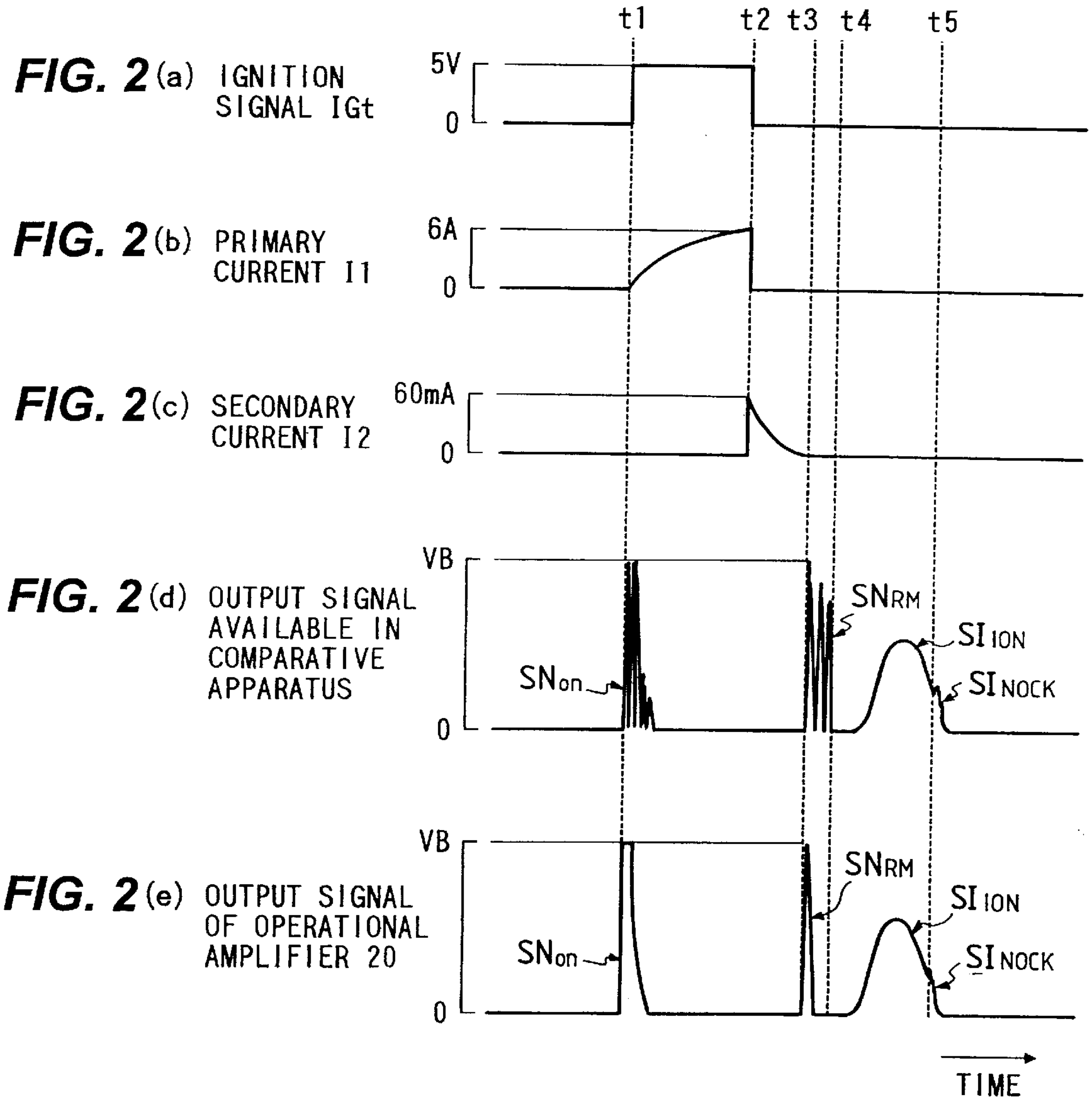
FIGS. 2(*a*)–FIG. 2(*e*) are a time-domain diagram of signals in the apparatus of FIG. 1 and also a comparative apparatus.

FIGS. 2(*a*)–FIG. 2(*e*) show the waveforms of various signals in the apparatus of FIG. 1 and the comparative apparatus which occur when the internal combustion engine is operated at a low rotational speed.

With reference to FIGS. 2(*a*)–FIG. 2(*e*), at a moment t1, the ignition signal IGt changes to a high-level state. The switching element 10 moves to an on state (a closed state) in response to the change of the ignition signal IGt to the high-level state. Accordingly, at the moment t1, a primary current I1 starts to flow through the primary winding 7*a* of the ignition coil 7. As shown in FIG. 2(*e*), at the moment t1, an ignition-on noise signal SNon starts to be superimposed on the output signal of the operational amplifier 20.

The ignition signal IGt remains in the high-level state until a moment t2 following the moment t1. At the moment t2, the ignition signal IGt returns to a low-level state. During the time interval between the moments t1 and t2, the primary current I1 continues to increase. As shown in FIG. 2(*e*), the ignition-on noise signal SNon remains present only during an initial part of the time interval between the moments t1 and t2.

At the moment t2, the primary current I1 is cut off. On the other hand, at the moment t2, a secondary current I2 starts to flow through the secondary winding 7*b* of the ignition coil 7. The secondary current I2 instantaneously rises to a great level equal to, for example, about 60 mA. After the moment t2, the secondary current I2 decreases as time goes by.

At a moment t3 following the moment t2, the secondary current 12 disappears. As shown in FIG. 2(*e*), at the moment t3, a residual-magnetism noise signal $SN_{RM}$ starts to be superimposed on the output signal of the operational amplifier 20. The residual-magnetism noise signal $SN_{RM}$ is caused by residual magnetism in an iron core of the ignition coil 7. As shown in the portion (e) of FIG. 2, the residual-magnetism noise signal $SN_{RM}$ disappears well before a moment t4 subsequent to the moment t3.

As shown in FIG. 2(*e*), after the moment t4, an effective ion current signal $SI_{ION}$ starts to be superimposed on the output signal of the operational amplifier 20. As shown in FIG. 2(*e*), at a moment t5 subsequent to the moment t4, an engine knock signal $SI_{NOCK}$ is superimposed on the ion current signal $SI_{ION}$.

As shown in FIG. 2(*d*), at the moment t1, an ignition-on noise signal SNon starts to be superimposed on the output signal of an operational amplifier in the comparative apparatus. The ignition-on noise signal SNon in the comparative apparatus vibrates at a high frequency (see FIG. 2(*d*)) while the ignition-on noise signal SNon in the apparatus of FIG. 1 does not have such high-frequency components (see the portion (e) of FIG. 2).

As shown in FIG. 2(*d*), at the moment t3, a residual-magnetism noise signal $SN_{RM}$ starts to be superimposed on the output signal of the operational amplifier in the comparative apparatus. As shown in FIG. 2(*d*), the residual-magnetism noise signal $SN_{RM}$ in the comparative apparatus remains present until the moment t4, and has three successive pulses. On the other hand, as shown in FIG. 2(*e*), the residual-magnetism noise signal $SN_{RM}$ in the apparatus of FIG. 1 disappears well before the moment t4, and has only a single pulse.

Accordingly, it is revealed that the diode 1, the resistor 2, and the zener diodes 3 and 6 are effective in suppressing a residual-magnetism noise signal $SN_{RM}$.

As the rotational speed of the internal combustion engine increases, the time position of an effective ion current signal $SI_{ION}$ moves toward the time position of a residual-magnetism noise signal $SN_{RM}$. The timing of the disappearance of a residual-magnetism noise signal $SN_{RM}$ in the apparatus of FIG. 1 is earlier than the timing of the disappearance of a residual-magnetism noise signal $SN_{RM}$ in the comparative apparatus (see FIG. 2(*d*) and FIG. 2(*e*)). Thus, in the apparatus of FIG. 1, even at high rotational speeds of the internal combustion engine, an effective ion current signal $SI_{ION}$ hardly overlaps a residual-magnetism noise signal $SN_{RM}$ in time position. This is advantageous in accurately detecting an effective ion current signal $SI_{ION}$ and an engine knock signal $SI_{NOCK}$.

The zener diode 6 subjects energy of residual magnetism to a voltage clamping process. Thereby, the residual magnetism is prevented from causing current resonance at the secondary winding 7*b* of the ignition coil 7 so that the life time of a residual-magnetism noise signal $SN_{RM}$ will be short.

When a spark occurs across the spark plug 8, the zener diode 3 forms a path via which a charging current flows into the capacitor 5. In the case where the operational amplifier 20 and the resistors 4 and 21 are provided in an IC chip, it is preferable to set the zener voltage of the zener diode 3 to 800 V or lower to prevent the occurrence of a high voltage in the IC chip. It is preferable to set the zener voltage of the zener diode 3 to 400 V or higher to prevent the occurrence of a spark at an undesirable early timing. Thus, the preferable range of the zener voltage of the zener diode 3 extends between 400 V and 800 V.

Second Embodiment

Figure 3:
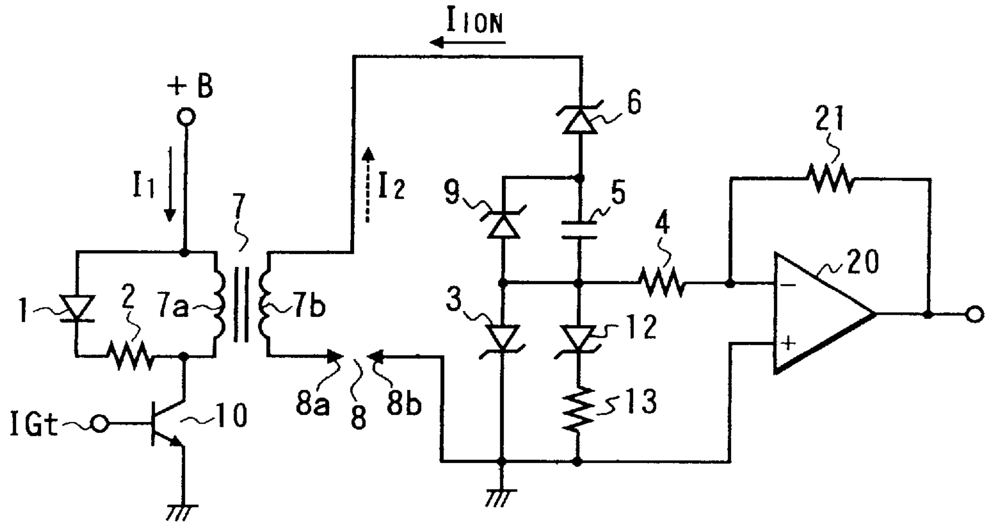
FIG. 3 is a schematic diagram of an apparatus for detecting a burning condition according to a second embodiment of this invention.

FIG. 3 shows a second embodiment of this invention which is similar to the embodiment of FIG. 1 except for an additional arrangement explained hereinafter. The embodiment of FIG. 3 includes a zener diode 12 and a resistor 13. The anode of the zener diode 12 is connected to the junction among zener diodes 3 and 9, a capacitor 5, and a resistor 4. The cathode of the zener diode 12 is connected to one end of the resistor 13. The other end of the resistor 13 is grounded. Thus, the series combination of the zener diode 12 and the resistor 13 is connected in parallel with the zener diode 3.

The zener diode 12 has a predetermined low zener voltage which is higher than the voltage across a battery. When the battery voltage is equal to 12 V, the zener voltage of the zener diode 12 is equal to, for example, 16 V. The resistor 13 has a predetermined high resistance equal to, for example, 200 KΩ. The zener diode 12 and the resistor 13 enable the zener diode 3 to be equivalent to a zener diode having a low zener voltage.

Third Embodiment

Figure 4:
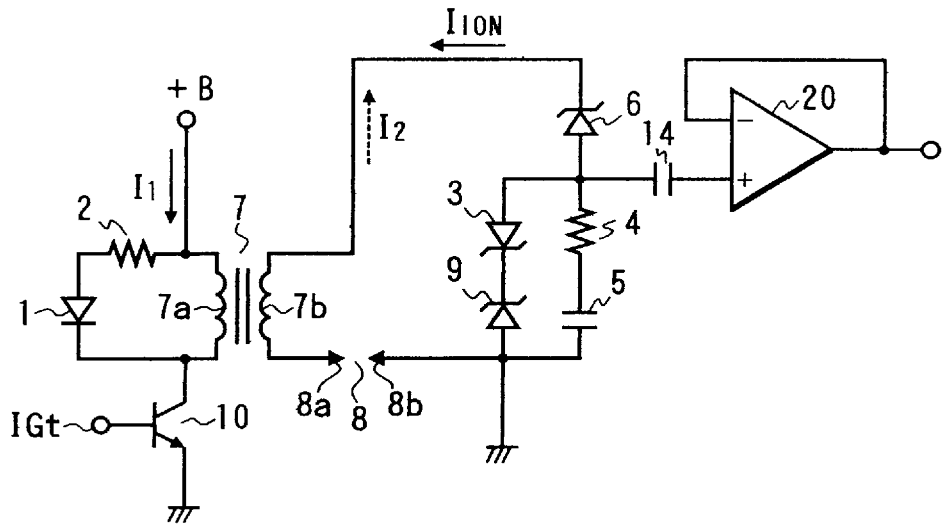
FIG. 4 is a schematic diagram of an apparatus for detecting a burning condition according to a third embodiment of this invention.

With reference to FIG. 4, an apparatus for detecting a condition of burning in an internal combustion engine includes an ignition coil 7 which has a primary winding 7*a* and a secondary winding 7*b*. A first end of the primary winding 7*a* of the ignition coil 7 is connected to the positive terminal "+B" of a battery. The negative terminal of the battery is grounded. The anode of a diode 1 is connected to the first end of the primary winding 7*a* of the ignition coil 7. The cathode of the diode 1 is connected via a resistor 2 to a second end of the primary winding 7*a* of the ignition coil 7. The second end of the primary winding 7*a* of the ignition coil 7 is grounded via a switching element 10 such as a switching transistor. The switching element 10 has a control terminal or a gate subjected to an ignition signal IGt outputted from an electronic control unit (not shown). The switching element 10 is closed and opened in response to the ignition signal IGt.

When the switching element 10 is closed by the ignition signal IGt, the battery enables a primary current I1 to flow through the primary winding 7*a* of the ignition coil 7. The diode 1 serves to block a current flowing along a direction opposite to the direction of the primary current I1. When the switching element 10 is closed, a current also flows through the diode 1. The resistor 2 serves to suppress the current flowing through the diode 1.

A spark plug 8 provided in a cylinder (a combustion chamber) of the internal combustion engine has a pair of first and second electrodes 8*a* and 8*b* opposed to each other. A first end of the secondary winding 7*b* of the ignition coil 7 is connected to the cathode of a zener diode 6. A second end of the secondary winding 7*b* of the ignition coil 7 is connected to the first electrode 8*a* of the spark plug 8. The second electrode 8*b* of the spark plug 8 is grounded. The anode of the zener diode 6 is connected to the anode of a zener diode 3 and also a first end of a resistor 4. The cathode of the zener diode 3 is connected to the cathode of a zener diode 9 and also a first end of a capacitor 5. In addition, a second end of the resistor 4 is connected to the cathode of the zener diode 9 and the first end of the capacitor 5. The anode of the zener diode 9 is grounded. A second end of the capacitor 5 is grounded. The capacitor 5 serves as a power supply for the detection of an ion current. The secondary winding 7*b* of the ignition coil 7, the spark plug 8, the zener diodes 3, 6, and 9, and the capacitor 5 are connected to form a closed-loop path along which a secondary current 12 flows. The zener diode 3 is located in a normal direction with respect to the secondary current I2. The zener diode 6 is located in a reverse direction with respect to the secondary current I2. The zener diode 9 controls the voltage across the capacitor 5.

One end of a capacitor 14 is connected to the junction among the resistor 4 and the zener diodes 3 and 6. The other end of the capacitor 14 is connected to the non-inverting input terminal of an operational amplifier 20. The inverting input terminal of the operational amplifier 20 is connected to the output terminal thereof. The capacitor 14 is used for a coupling purpose.

During a given time interval, an ion current $I_{ION}$ flows via the resistor 4, the zener diode 6, the secondary winding 7*b* of the ignition coil 7, the spark plug 8, and the capacitor 5. As previously described, the capacitor 5 serves as a power supply for the detection of an ion current $I_{ION}$. The voltage across the resistor 4 depends on the ion current $I_{ION}$. Thus, the resistor 4 serves to sense the ion current $I_{ION}$. The resistor 4 has a predetermined high resistance equal to, for example, 500 KΩ. The high resistance of the resistor 4 is effective in suppressing unwanted ignition of an air-fuel mixture in the engine cylinder.

As previously described, a signal voltage representing an ion current $I_{ION}$ is generated by the resistor 4. The capacitor 14 transmits the signal voltage to the operational amplifier 20 while removing a direct-current component therefrom.

The diode 1 has the following function. When residual magnetism occurs in the ignition coil 7, a current caused by the residual magnetism is allowed to flow through the primary winding 7*a* of the ignition coil 7, the resistor 2, and the diode 1. Accordingly, energy of the residual magnetism is consumed.

The zener diode 3 has the following functions. The zener diode 3 suppresses unwanted ignition of an air-fuel mixture in the engine cylinder. In addition, the zener diode 3 suppresses voltage resonance caused by residual magnetism. Furthermore, the zener diode 3 suppresses resonance of an arc voltage between the first and second electrodes 8*a* and 8*b* of the spark plug 8. It is preferable that the zener diode 3 has a predetermined high zener voltage in the range of, for example, 400 V to 800 V.

The zener diode 6 has the following function. The zener diode 6 suppresses voltage resonance caused by residual magnetism. Specifically, the zener diode 6 shortens the life time of the voltage resonance. It is preferable that the zener diode 6 has a predetermined low zener voltage equal to, for example, 75 V.

A comparative apparatus is made which equals the apparatus of FIG. 4 except for the following point. The diode 1, the resistor 2, and the zener diodes 3 and 6 are absent from the comparative apparatus.

Figure 5:
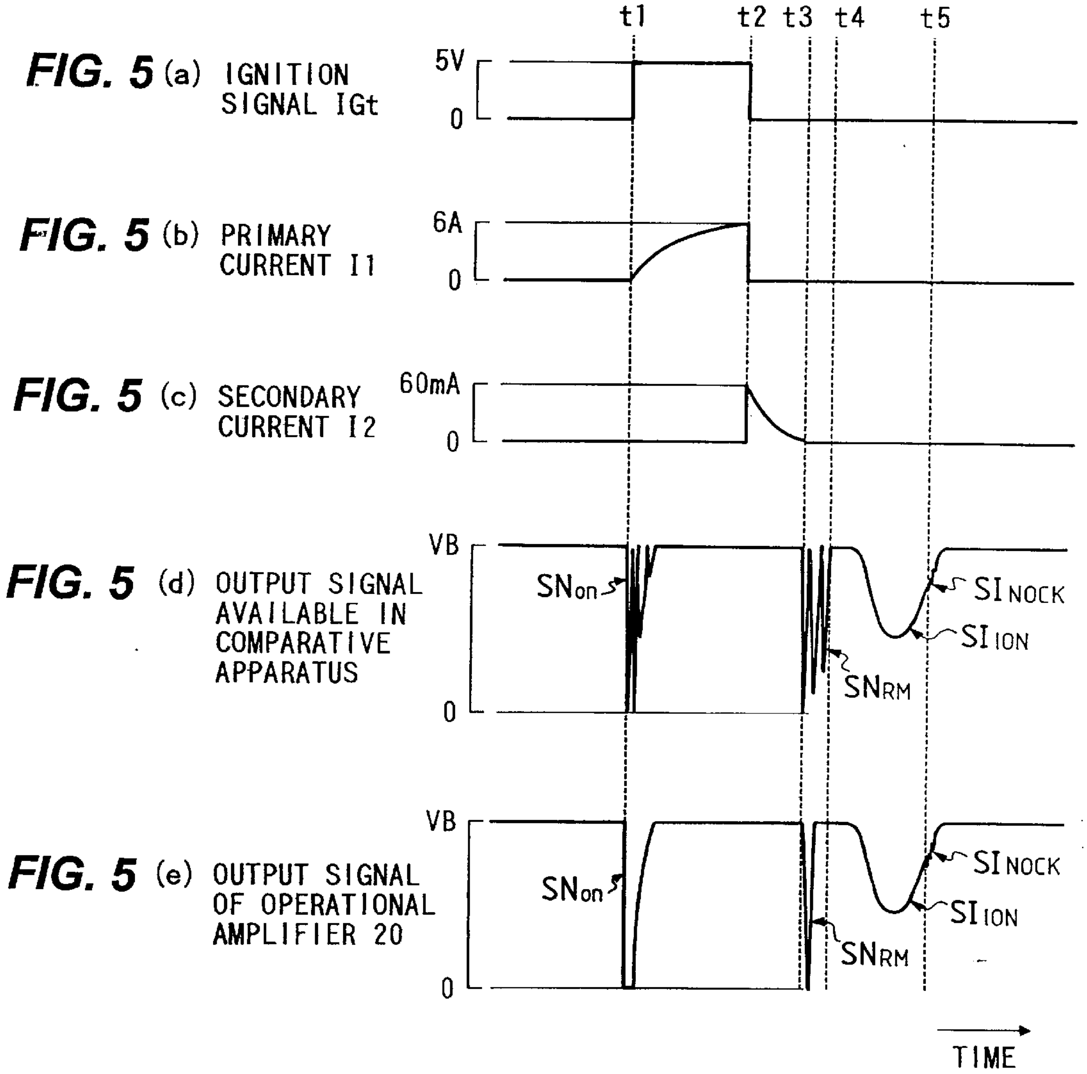
FIGS. 5(*a*)–FIG. 5(*e*) are a time-domain diagram of signals in the apparatus of FIG. 4 and also a comparative apparatus.

FIGS. 5(*a*)–FIG. 5(*e*) show the waveforms of various signals in the apparatus of FIG. 4 and the comparative apparatus which occur when the internal combustion engine is operated at a low rotational speed.

With reference to FIGS. 5(*a*)–FIG. 5(*e*), at a moment t1, the ignition signal IGt changes to a high-level state. The switching element 10 moves to an on state (a closed state) in response to the change of the ignition signal IGt to the high-level state. Accordingly, at the moment t1, a primary current I1 starts to flow through the primary winding 7*a* of the ignition coil 7. As shown in FIG. 5(*e*), at the moment t1, an ignition-on noise signal SNon starts to be superimposed on the output signal of the operational amplifier 20.

The ignition signal IGt remains in the high-level state until a moment t2 following the moment t1. At the moment t2, the ignition signal IGt returns to a low-level state. During the time interval between the moments t1 and t2, the primary current I1 continues to increase. As shown in FIG. 5(*e*), the ignition-on noise signal SNon remains present only during an initial part of the time interval between the moments t1 and t2.

At the moment t2, the primary current I1 is cut off. On the other hand, at the moment t2, a secondary current I2 starts to flow through the secondary winding 7*b* of the ignition coil 7. The secondary current I2 instantaneously rises to a great level equal to, for example, about 60 mA. After the moment t2, the secondary current I2 decreases as time goes by.

At a moment t3 following the moment t2, the secondary current 12 disappears. As shown in FIG. 5(*e*), at the moment t3, a residual-magnetism noise signal $SN_{RM}$ starts to be superimposed on the output signal of the operational amplifier 20. The residual-magnetism noise signal $SN_{RM}$ is caused by residual magnetism in an iron core of the ignition coil 7. As shown in FIG. 5*e*, the residual-magnetism noise signal $SN_{RM}$ disappears well before a moment t4 subsequent to the moment t3.

As shown in FIG. 5*e*, after the moment t4, an effective ion current signal $SI_{ION}$ starts to be superimposed on the output signal of the operational amplifier 20. As shown in of FIG. 5(*e*), at a moment t5 subsequent to the moment t4, an engine knock signal $SI_{NOCK}$ is superimposed on the ion current signal $SI_{ION}$.

As shown in FIG. 5(*d*), at the moment t1, an ignition-on noise signal SNon starts to be superimposed on the output signal of an operational amplifier in the comparative apparatus. The ignition-on noise signal SNon in the comparative apparatus vibrates at a high frequency (see FIG. 5(*d*)) while the ignition-on noise signal SNon in the apparatus of FIG. 4 does not have such high-frequency components (see FIG. 5(*c*)).

As shown in FIG. 5(*d*), at the moment t3, a residual-magnetism noise signal $SN_{RM}$ starts to be superimposed on the output signal of the operational amplifier in the comparative apparatus. As shown in FIG. 5(*d*), the residual-magnetism noise signal $SN_{RM}$ in the comparative apparatus remains present until the moment t4, and has three successive pulses. On the other hand, as shown in FIG. 5(*e*), the residual-magnetism noise signal $SN_{RM}$ in the apparatus of FIG. 4 disappears well before the moment t4, and has only a single pulse.

Accordingly, it is revealed that the diode 1, the resistor 2, and the zener diodes 3 and 6 are effective in suppressing a residual-magnetism noise signal $SN_{RM}$.

As the rotational speed of the internal combustion engine increases, the time position of an effective ion current signal $SI_{ION}$ moves toward the time position of a residual-magnetism noise signal $SN_{RM}$. The timing of the disappearance of a residual-magnetism noise signal $SN_{RM}$ in the apparatus of FIG. 4 is earlier than the timing of the disappearance of a residual-magnetism noise signal $SN_{RM}$ in the comparative apparatus (see FIG. 5(*d* and FIG. 5(*e*)). Thus, in the apparatus of FIG. 4, even at high rotational speeds of the internal combustion engine, an effective ion current signal $SI_{ION}$ hardly overlaps a residual-magnetism noise signal $SN_{RM}$ in time position. This is advantageous in accurately detecting an effective ion current signal $SI_{ION}$ and an engine knock signal $SI_{NOCK}$.

The zener diode 6 subjects energy of residual magnetism to a voltage clamping process. Thereby, the residual magnetism is prevented from causing current resonance at the secondary winding 7*b* of the ignition coil 7 so that the life time of a residual-magnetism noise signal $SN_{RM}$ will be short.

When a spark occurs across the spark plug 8, the zener diode 3 forms a path via which a charging current flows into the capacitor 5. In the case where the operational amplifier 20 is provided in an IC chip, it is preferable to set the zener voltage of the zener diode 3 to 800 V or lower to prevent the occurrence of a high voltage in the IC chip. It is preferable to set the zener voltage of the zener diode 3 to 400 V or higher to prevent the occurrence of a spark at an undesirable early timing. Thus, the preferable range of the zener voltage of the zener diode 3 extends between 400 V and 800 V.

Fourth Embodiment

Figure 6:
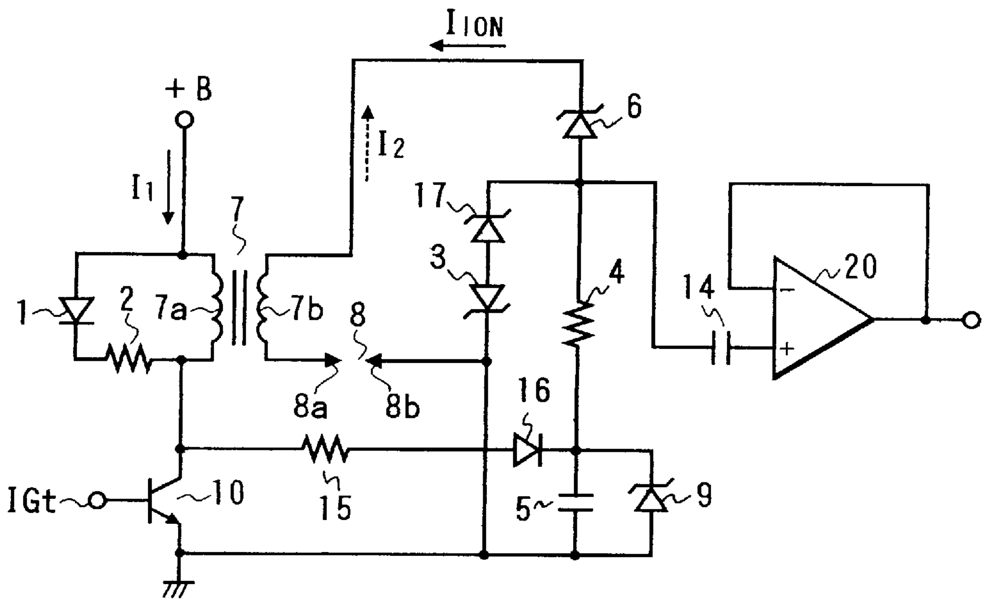
FIG. 6 is a schematic diagram of an apparatus for detecting a burning condition according to a fourth embodiment of this invention.

With reference to FIG. 6, an apparatus for detecting a condition of burning in an internal combustion engine includes an ignition coil 7 which has a primary winding 7*a* and a secondary winding 7*b*. A first end of the primary winding 7*a* of the ignition coil 7 is connected to the positive terminal "+B" of a battery. The negative terminal of the battery is grounded. The anode of a diode 1 is connected to the first end of the primary winding 7*a* of the ignition coil 7. The cathode of the diode 1 is connected via a resistor 2 to a second end of the primary winding 7*a* of the ignition coil 7. The second end of the primary winding 7*a* of the ignition coil 7 is grounded via a switching element 10 such as a switching transistor. The switching element 10 has a control terminal or a gate subjected to an ignition signal IGt outputted from an electronic control unit (not shown). The switching element 10 is closed and opened in response to the ignition signal IGt.

When the switching element 10 is closed by the ignition signal IGt, the battery enables a primary current I1 to flow through the primary winding 7*a* of the ignition coil 7. The diode 1 serves to block a current flowing along a direction opposite to the direction of the primary current I1. When the switching element 10 is closed, a current also flows through the diode 1. The resistor 2 serves to suppress the current flowing through the diode 1.

A spark plug 8 provided in a cylinder (a combustion chamber) of the internal combustion engine has a pair of first and second electrodes 8*a* and 8*b* opposed to each other. A first end of the secondary winding 7*b* of the ignition coil 7 is connected to the cathode of a zener diode 6. A second end of the secondary winding 7*b* of the ignition coil 7 is connected to the first electrode 8*a* of the spark plug 8. The second electrode 8*b* of the spark plug 8 is grounded. The anode of the zener diode 6 is connected to the cathode of a zener diode 17 and also a first end of a resistor 4. The anode of the zener diode 17 is connected to the anode of a zener diode 3. The cathode of the zener diode 3 is grounded. A second end of the resistor 4 is connected to the cathode of a zener diode 9, a first end of a capacitor 5, and the cathode of a diode 16. The anode of the zener diode 9 is grounded. A second end of the capacitor 5 is grounded. The capacitor 5 serves as a power supply for the detection of an ion current. The anode of the diode 16 is connected via a resistor 15 to the junction among the resistor 2, the switching element 10, and the primary winding 7*a* of the ignition coil 7. The capacitor 5 can be charged by a current which flows via the resistor 15 and the diode 16. The zener diode 3 is located in a normal direction with respect to a secondary current 12. The zener diode 6 is located in a reverse direction with respect to the secondary current I2. The zener diode 9 controls the voltage across the capacitor 5.

One end of a capacitor 14 is connected to the junction among the resistor 4 and the zener diodes 6 and 17. The other end of the capacitor 14 is connected to the non-inverting input terminal of an operational amplifier 20. The inverting input terminal of the operational amplifier 20 is connected to the output terminal thereof. The capacitor 14 is used for a coupling purpose.

During a given time interval, an ion current $I_{ION}$ flows via the resistor 4, the zener diode 6, the secondary winding 7*b* of the ignition coil 7, the spark plug 8, and the capacitor 5. As previously described, the capacitor 5 serves as a power supply for the detection of an ion current $I_{ION}$. The voltage across the resistor 4 depends on the ion current $I_{ION}$. Thus, the resistor 4 serves to sense the ion current $I_{ION}$. The resistor 4 has a predetermined high resistance equal to, for example, 500 KΩ. The high resistance of the resistor 4 is effective in suppressing unwanted ignition of an air-fuel mixture in the engine cylinder.

As previously described, a signal voltage representing an ion current $I_{ION}$ is generated by the resistor 4. The capacitor 14 transmits the signal voltage to the operational amplifier 20 while removing a direct-current component therefrom.

The diode 1 has the following function. When residual magnetism occurs in the ignition coil 7, a current caused by the residual magnetism is allowed to flow through the primary winding 7*a* of the ignition coil 7, the resistor 2, and the diode 1. Accordingly, energy of the residual magnetism is consumed.

The zener diode 3 has the following functions. The zener diode 3 suppresses unwanted ignition of an air-fuel mixture in the engine cylinder. In addition, the zener diode 3 suppresses voltage resonance caused by residual magnetism. Furthermore, the zener diode 3 suppresses resonance of an arc voltage between the first and second electrodes 8*a* and 8*b* of the spark plug 8. It is preferable that the zener diode 3 has a predetermined high zener voltage in the range of, for example, 400 V to 800 V.

The zener diode 6 has the following function. The zener diode 6 suppresses voltage resonance caused by residual magnetism. Specifically, the zener diode 6 shortens the life time of the voltage resonance. It is preferable that the zener diode 6 has a predetermined low zener voltage equal to, for example, 75 V.

The diode 1, the resistor 2, and the zener diodes 3 and 6 are effective in suppressing a residual-magnetism noise signal $SN_{RM}$. The zener diode 6 subjects energy of residual magnetism to a voltage clamping process. Thereby, the residual magnetism is prevented from causing current resonance at the secondary winding 7*b* of the ignition coil 7 so that the life time of a residual-magnetism noise signal $SN_{RM}$ will be short.

Fifth Embodiment

Figure 7:
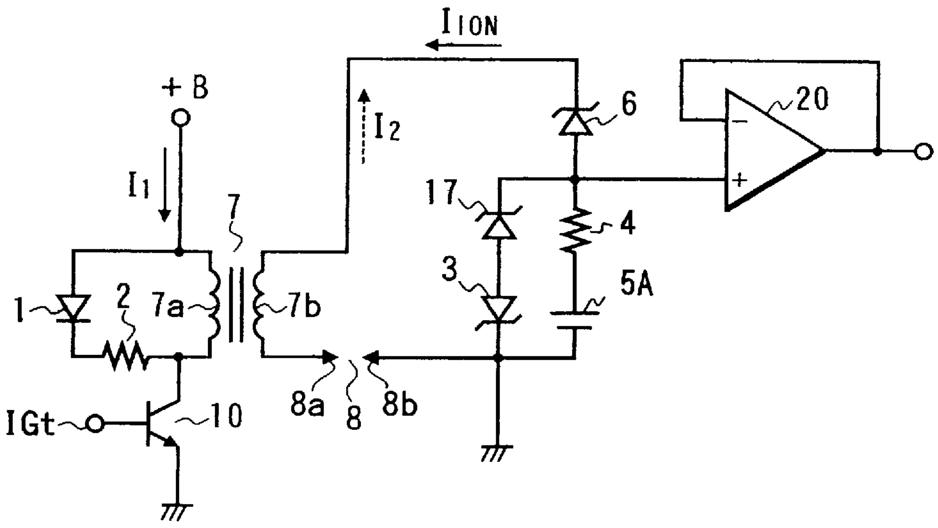
FIG. 7 is a schematic diagram of an apparatus for detecting a burning condition according to a fifth embodiment of this invention.

With reference to FIG. 7, an apparatus for detecting a condition of burning in an internal combustion engine includes an ignition coil 7 which has a primary winding 7*a* and a secondary winding 7*b*. A first end of the primary winding 7*a* of the ignition coil 7 is connected to the positive terminal "+B" of a vehicle battery. The negative terminal of the vehicle battery is grounded. The anode of a diode 1 is connected to the first end of the primary winding 7*a* of the ignition coil 7. The cathode of the diode 1 is connected via a resistor 2 to a second end of the primary winding 7*a* of the ignition coil 7. The second end of the primary winding 7*a* of the ignition coil 7 is grounded via a switching element 10 such as a switching transistor. The switching element 10 has a control terminal or a gate subjected to an ignition signal IGt outputted from an electronic control unit (not shown). The switching element 10 is closed and opened in response to the ignition signal IGt.

When the switching element 10 is closed by the ignition signal IGt, the vehicle battery enables a primary current I1 to flow through the primary winding 7*a* of the ignition coil 7. The diode 1 serves to block a current flowing along a direction opposite to the direction of the primary current I1. When the switching element 10 is closed, a current also flows through the diode 1. The resistor 2 serves to suppress the current flowing through the diode 1.

A spark plug 8 provided in a cylinder (a combustion chamber) of the internal combustion engine has a pair of first and second electrodes 8*a* and 8*b* opposed to each other. A first end of the secondary winding 7*b* of the ignition coil 7 is connected to the cathode of a zener diode 6. A second end of the secondary winding 7*b* of the ignition coil 7 is connected to the first electrode 8*a* of the spark plug 8. The second electrode 8*b* of the spark plug 8 is grounded. The anode of the zener diode 6 is connected to the cathode of a zener diode 17 and also a first end of a resistor 4. The anode of the zener diode 17 is connected to the anode of a zener diode 3. The cathode of the zener diode 3 is grounded. A second end of the resistor 4 is connected to the positive terminal of a battery 5A separate from the vehicle battery. The negative terminal of the battery 5A is grounded. The battery 5A serves as a power supply for the detection of an ion current. The zener diode 3 is located in a normal direction with respect to a secondary current 12. The zener diode 6 is located in a reverse direction with respect to the secondary current I2.

The non-inverting input terminal of an operational amplifier 20 is connected to the Junction among the resistor 4 and the zener diodes 6 and 17. The inverting input terminal of the operational amplifier 20 is connected to the output terminal thereof.

During a given time interval, an ion current $I_{ION}$ flows via the resistor 4, the zener diode 6, the secondary winding 7*b* of the ignition coil 7, the spark plug 8, and the battery 5A. As previously described, the battery 5A serves as a power supply for the detection of an ion current $I_{ION}$. The voltage across the resistor 4 depends on the ion current $I_{ION}$. Thus, the resistor 4 serves to sense the ion current $I_{ION}$. The voltage across the resistor 4 is transmitted to the operational amplifier 20. The resistor 4 has a predetermined high resistance equal to, for example, 500 KΩ. The high resistance of the resistor 4 is effective in suppressing unwanted ignition of an air-fuel mixture in the engine cylinder.

The diode 1 has the following function. When residual magnetism occurs in the ignition coil 7, a current caused by the residual magnetism is allowed to flow through the primary winding 7*a* of the ignition coil 7, the resistor 2, and the diode 1. Accordingly, energy of the residual magnetism is consumed.

The zener diode 3 has the following functions. The zener diode 3 suppresses unwanted ignition of an air-fuel mixture in the engine cylinder. In addition, the zener diode 3 suppresses voltage resonance caused by residual magnetism. Furthermore, the zener diode 3 suppresses resonance of an arc voltage between the first and second electrodes 8*a* and 8*b* of the spark plug 8. It is preferable that the zener diode 3 has a predetermined high zener voltage in the range of, for example, 400 V to 800 V.

The zener diode 6 has the following function. The zener diode 6 suppresses voltage resonance caused by residual magnetism. Specifically, the zener diode 6 shortens the life time of the voltage resonance. It is preferable that the zener diode 6 has a predetermined low zener voltage equal to, for example, 75 V.

The diode 1, the resistor 2, and the zener diodes 3 and 6 are effective in suppressing a residual-magnetism noise signal $SN_{RM}$. The zener diode 6 subjects energy of residual magnetism to a voltage clamping process. Thereby, the residual magnetism is prevented from causing current resonance at the secondary winding 7*b* of the ignition coil 7 so that the life time of a residual-magnetism noise signal $SN_{RM}$ will be short.

What is claimed is:

1. An apparatus for detecting a condition of burning in an internal combustion engine, comprising:

a spark plug;

an ignition coil having a primary winding and a secondary winding, the secondary winding being connected to the spark plug;

an ion current sensing resistor connected to a low voltage side of the secondary winding of the ignition coil for sensing an ion current;

a diode connected in parallel with the primary winding of the ignition coil;

a switching element connected in series with the primary winding of the ignition coil and being movable into and out of an on state; and means for resisting a current flowing through the diode when the switching element is in the on state.

2. An apparatus as recited in claim 1, further comprising a zener diode connected in parallel with the ion current sensing resistor for suppressing on discharge.

3. An apparatus as recited in claim 1, further comprising a discharge loop for the ion current, a power supply located in the discharge loop for detection of the ion current, and a zener diode disposed in the discharge loop for clamping residual magnetism in the ignition coil, the discharge loop having the secondary winding of the ignition coil and the spark plug.

4. An apparatus for detecting a condition of burning in an internal combustion engine, comprising:

a spark plug;

an ignition coil having a primary winding and a secondary winding, the secondary winding being connected to the spark plug;

an ion current sensing resistor connected to a low voltage side of the secondary winding of the ignition coil for sensing an ion current;

a first diode connected in parallel with the ion current sensing resistor for suppressing on discharge;

a residual magnetism resonance element connected in parallel with the first diode for providing resonance with respect to residual magnetism;

a power supply for detection of the ion current; and a second diode for clamping the residual magnetism, the second diode having a cathode and an anode, the cathode being connected to the secondary winding of the ignition coil, the anode being connected to the power supply.

5. An apparatus for detecting a condition of burning in an internal combustion engine, comprising:

a spark plug;

an ignition coil having a primary winding and a secondary winding, the secondary winding being connected to the spark plug;

an ion current sensing resistor connected to a low voltage side of the secondary winding of the ignition coil for sensing an ion current;

a first diode connected in parallel with the primary winding of the ignition coil;

a switching element connected in series with the primary winding of the ignition coil and being movable into and out of an on state;

means for resisting a current flowing through the diode when the switching element is in the on state;

a second diode connected in parallel with the ion current sensing resistor for suppressing on discharge;

a residual magnetism resonance element connected in parallel with the second diode for providing resonance with respect to residual magnetism;

a power supply for detection of the ion current; and a third diode for clamping the residual magnetism, the second diode having a cathode and an anode, the cathode being connected to the secondary winding of the ignition coil, the anode being connected to the power supply.

6. An apparatus for detecting a condition of burning in an internal combustion engine, comprising:

a spark plug;

an ignition coil having a primary winding and a secondary winding;

a first zener diode;

a second zener diode; and a third zener diode;

wherein the spark plug, the secondary winding of the ignition coil, the first zener diode, the second zener diode, and the third zener diode are connected in a loop, and one of polarities of the first, second, and third zener diodes is opposite to remaining two of the polarities with respect to a direction of a current flowing through the loop.

7. An apparatus as recited in claim 6, further comprising means connected to the loop for detecting an ion current flowing through a part of the loop.

8. An apparatus as recited in claim 6, further comprising a series combination of a diode and a resistor which is connected in parallel with the primary winding of the ignition coil.

9. An apparatus as recited in claim 6, further comprising a capacitor connected in parallel with one of the first, second, and third zener diodes.

* * * * *